United States Patent [19]

Frehn

[11] Patent Number: 4,546,217
[45] Date of Patent: Oct. 8, 1985

[54] TELEPHONE SANITARY COVER

[76] Inventor: John L. Frehn, 44742 Elm Ave., Lancaster, Calif. 93534

[21] Appl. No.: 546,167

[22] Filed: Oct. 27, 1983

[51] Int. Cl.$^4$ ............................................. H04R 1/12
[52] U.S. Cl. .................................. 179/185; 179/178; 179/179; 179/184
[58] Field of Search ............... 179/185, 184, 187, 178, 179/179; 174/DIG. 11

[56] References Cited

U.S. PATENT DOCUMENTS

| | | | |
|---|---|---|---|
| 2,050,097 | 8/1936 | Kalenoff | 179/185 |
| 2,473,775 | 6/1949 | Allen et al. | 179/179 |
| 2,554,081 | 5/1951 | Allen et al. | 179/179 |
| 2,575,280 | 11/1951 | Long | 179/185 |
| 3,012,108 | 12/1961 | Bell | 179/103 |
| 3,038,205 | 6/1962 | Plummer | 174/DIG. 11 |
| 3,038,558 | 6/1962 | Plummer | 174/DIG. 11 |
| 3,087,983 | 4/1963 | Plummer | 174/DIG. 11 |
| 3,169,171 | 2/1965 | Wachs et al. | 179/185 |
| 3,334,196 | 8/1967 | Pearlman | 179/179 |
| 3,491,221 | 1/1970 | Zamarra | 179/184 |
| 3,568,308 | 3/1971 | Plakson | 174/DIG. 11 |
| 3,582,532 | 6/1971 | Plummer | 174/DIG. 11 |
| 3,657,487 | 4/1972 | Schwanck et al. | 179/179 |
| 3,838,229 | 9/1974 | Morrell et al. | 179/179 |
| 3,962,555 | 6/1976 | Efaw | 179/185 |
| 4,436,965 | 3/1984 | Morse | 179/184 |
| 4,438,300 | 3/1984 | Morse | 179/184 |

FOREIGN PATENT DOCUMENTS

| | | | |
|---|---|---|---|
| 586492 | 3/1977 | Switzerland | 179/179 |
| 707767 | 4/1954 | United Kingdom | 179/179 |
| 458852 | 3/1957 | United Kingdom | 179/185 |

OTHER PUBLICATIONS

Telephony, "Keyboard Cover", p. 94, Jul. 1981.
Telephony, "Telephone Cover", p. 44, Nov. 1980.

Primary Examiner—Gene Z. Rubinson
Assistant Examiner—Danita R. Byrd
Attorney, Agent, or Firm—Cislo, O'Reilly & Thomas

[57] ABSTRACT

An inexpensive, disposable sanitary cover for telephones, comprising a sleeve-like member adapted to receive and retain therein a telephone handset, and wherein a cord-encasing member is also provided to encase a telephone cord. A generally conformable base-encasing member adapted to encase and seal a telephone base member from direct contact with a telephone user is also provided for.

9 Claims, 7 Drawing Figures

U.S. Patent   Oct. 8, 1985   Sheet 1 of 3   4,546,217
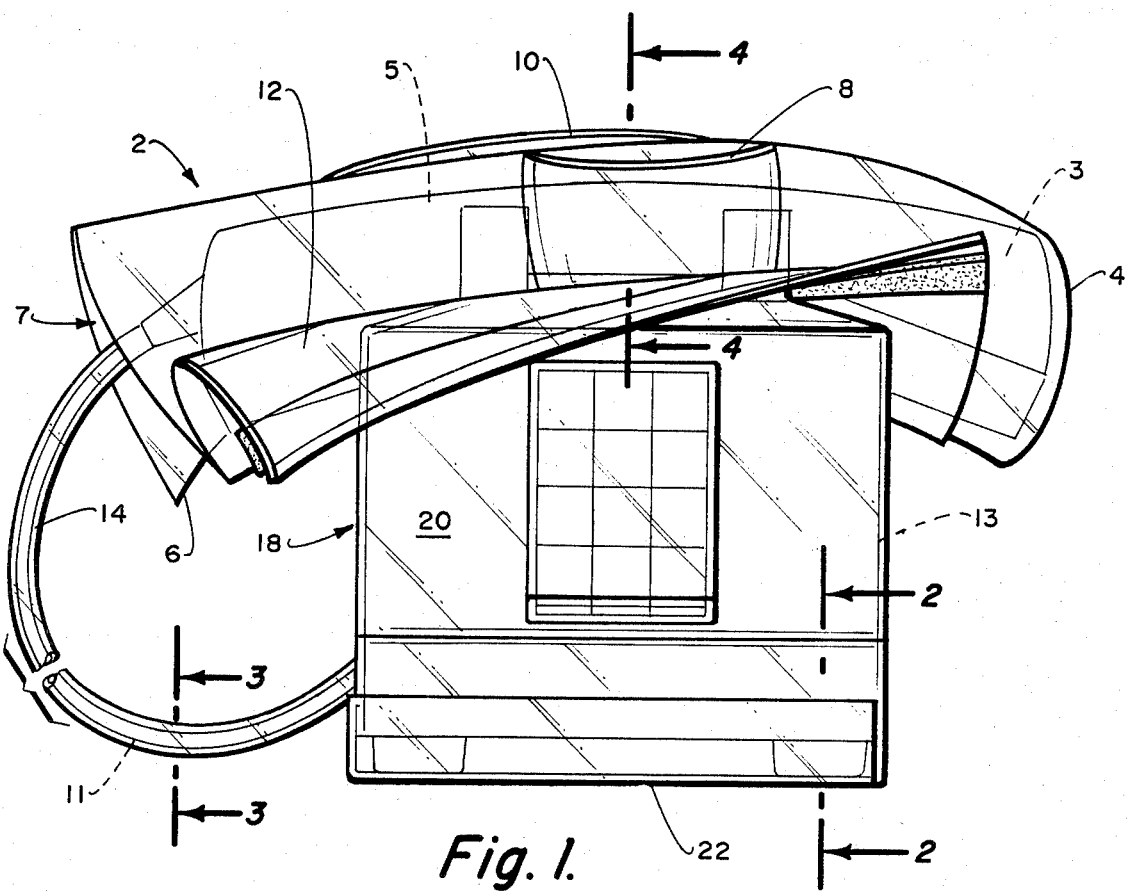
Fig. 1.
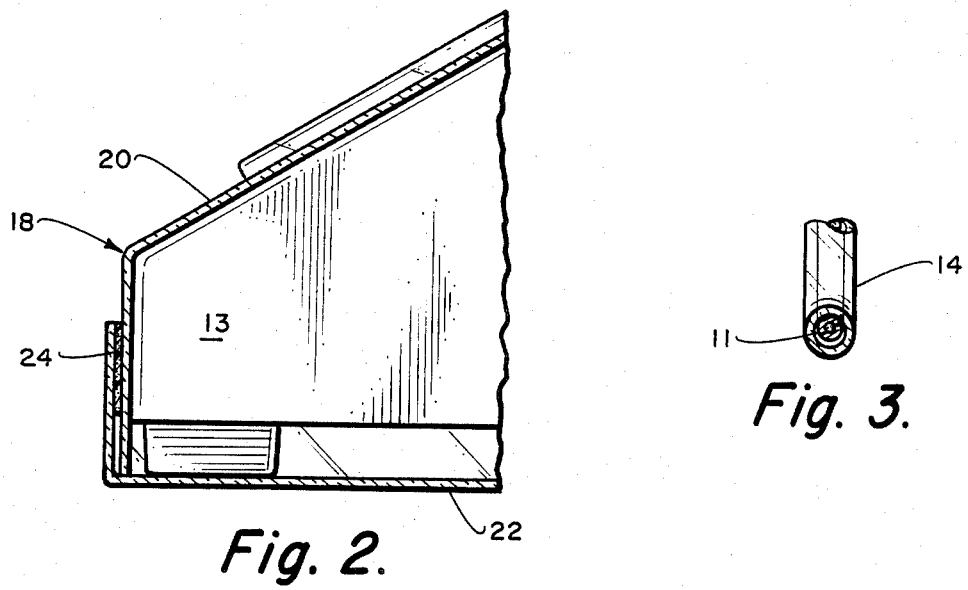
Fig. 2.
Fig. 3.

TELEPHONE SANITARY COVER

This invention relates to an inexpensive, disposable, sanitary cover for telephones and pertains, in one particular embodiment, to a sanitary cover capable of being vended in coin-operated machines and the like for use in general, public situations, including, but not limited to, public telephones.

Another contemplated embodiment of the invention is a sanitary cover for an entire telephone mechanism designed to impair or prevent the passage of germs or undesirable substances resident on the telephone to subsequent users of the telephone.

The telephone is an essential and all-pervasive element of modern society. Almost everyone, from the very young to the very old, is exposed to it on a daily basis. As such a focal point of modern life, it should be kept as clean and germ-free as is possible to prevent the spread of contagion in our society.

This is clearly seen where a telephone is used in a hospital ward, where illness and germs are known to abound, but it is just as true for the public telephone used by a cross-section of society each day. In the event that just one of this multitude of users were sick, every subsequent user is subject to possible infection by whatever germs might be able to sustain themselves on the telephone until being passed on to the next user of the telephone.

The ready public access of the telephone may also result in the accumulation of undesirable substances on the telephone which may offend a subsequent user's more refined sensitivities, for example, grease or dirt left behind by a previous user.

In these respects, although it may not be feasible or possible to eliminate these accumulations at their inception, precautions may be taken by any particular user to resist the spreading of them.

2. Prior Art

A number of previous attempts have been made to solve the problems stated above, but all have failed to gain any widespread acceptance among the general public.

Efaw Patent No. 3,962,555, is directed to a telephone handset guard, where, as clearly shown, there is provided a guard formed of what is termed a flexible material such as sheet vinyl or polyethylene. The guard has a first cap and a second cap covering the receiver and the transmitter sections. Additionally, there is provided a section which covers the main body of the handheld transmitter/receiver sections. Thus, this does provide for a plastic-like covering for most of the telephone headset assembly, but it is of a different construction than is contemplated herein, and fails to provide a cover which isolates the telephone mechanism from user contact.

Bell Patent No. 3,012,108 is directed to a telephone apparatus and includes two attachment members joined together by shanks which are stated to be of an integral construction and formed of polyvinyl chloride resin. This apparatus does not, however, cover the entire handle portion of the telephone as is taught herein, but it does provide for a covering for the telephone itself throughout a major portion of the handle of the headset.

Long Patent No. 2,575,280 is directed to a removable protector for the handles of the telephone headset. This provides a body portion which is stated to be made of plastic or like material. This does not, however, cover the receiver or transmitter section of the telephone headset as is contemplated in the herein invention.

Wachs, et al. Patent No. 3,169,171 is merely directed to disposable, sanitary cap covers for telephones. It should be noted that this reference teaches the provision of cap covers for both the mouthpiece and the earpiece of the telephone headset. Additionally, as stated in the disclosure, the body of the cap covers, may be made of a thermoplastic or thermosetting plastic material such as vinyl, polyethylene or the like. The present device differs from the reference by providing a protective covering for the entire transmitter/receiver section of the telephone headset, as opposed to merely a sanitary cover for the mouthpiece or the headpiece sections. Additionally, a sanitary cover for an entire telephone mechanism is also provided herein.

SUMMARY OF THE INVENTION

It is an object of the invention to provide a new and improved, inexpensive, disposable sanitary cover for telephones in order to prevent the spread of contagion to users of the telephone, and to further restrict the spread of undesirable substances which may have accumulated on the telephone to any subsequent user of the telephone.

It is another object of the invention to provide an economical device to prevent the spread of contagion and undesirable substances to subsequent users which is both practical and convenient to the general public.

It is another important object of the invention to provide a sanitary cover capable of being vended from coin-operated machines and the like for use in general, public situations, such as public telephones.

It is another important object of this invention to protect the telephone itself from harmful substances which may be deposited on it by a user.

These and other objects and advantages of this invention will become apparent from the following description thereof in view of the accompanying drawings.

BRIEF DESCRIPTION OF THE DRAWINGS

FIG. 1 is a frontal view of a desk telephone with the invention in place thereon;

FIG. 2 is a fragmented, cross-sectional view taken along the line 2—2 of FIG. 1, showing a base-encasing member of the invention encapsulating the base member of a desk telephone; also shown is an example as to how the base-encasing member of the invention can be secured to itself in order to encapsulate the base member of the desk telephone;

FIG. 3 is a fragmented, cross-sectional view taken along the line 3—3 of FIG. 1 showing how a cord connecting the base member of the desk telephone to the handset member is totally encased within the cord encasing member of the invention;

DESCRIPTION OF THE BEST EMBODIMENTS CONTEMPLATED

Figure 1A:
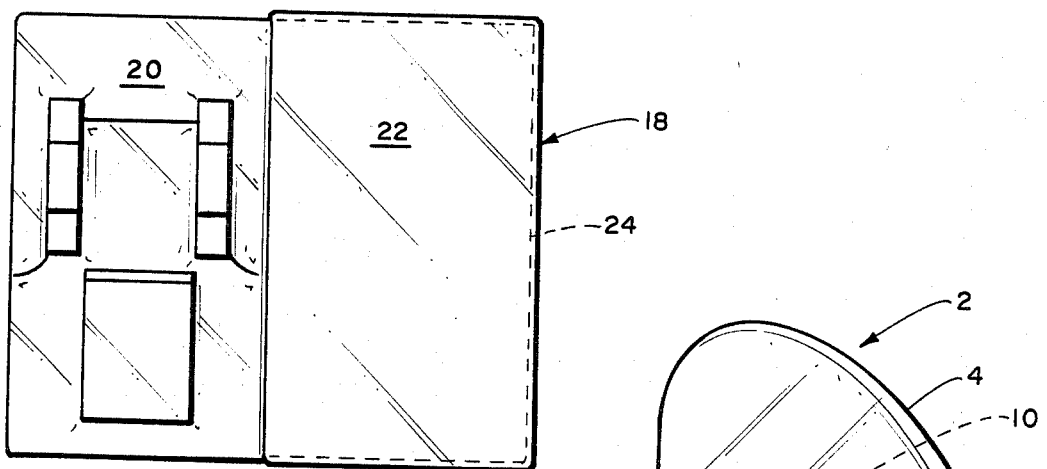
FIG. 1a is a top plan view of the base member of the invention in the unfolded or open position.

The present invention concerns an inexpensive, disposable telephone sanitary cover, which impairs or prevents the spread of germs or undesirable accumulations found on the telephone from passing to any subsequent user of the telephone.

The sanitary cover proposed herein is both economical, easily used and disposable so as to minimize any inconvenience to the user of the telephone, thereby encouraging its use.

The sanitary cover is also capable of being vended from coin-operated machines and the like thereby making it readily accessible to any telephone user.

One embodiment of the invention for use in general, public situations, or in areas where the risk of contagion is moderate, for example, public telephones, would comprise a sleeve-like handset member 2 shown in FIG. 1, and 4 through 6 of a thin, flexible material, closed on one end 4, open on its opposite end 7 and partially opened along one side 6, to receive and retain in the closed end 4, one end 3 of a telephone handset 5.

On the exterior surface of the sleeve-like handset member 2 are located a first pouch 8 and a second pouch 10, intermediate between said closed end 4 and said open end 7 of said sleeve-like handset member 2.

Said pouches have their inlets in opposition to receive fingers of a hand inserted therein to grasp and retain a telephone handset 5 retained in said closed end of the sleeve-like handset member 2.

Figure 6:
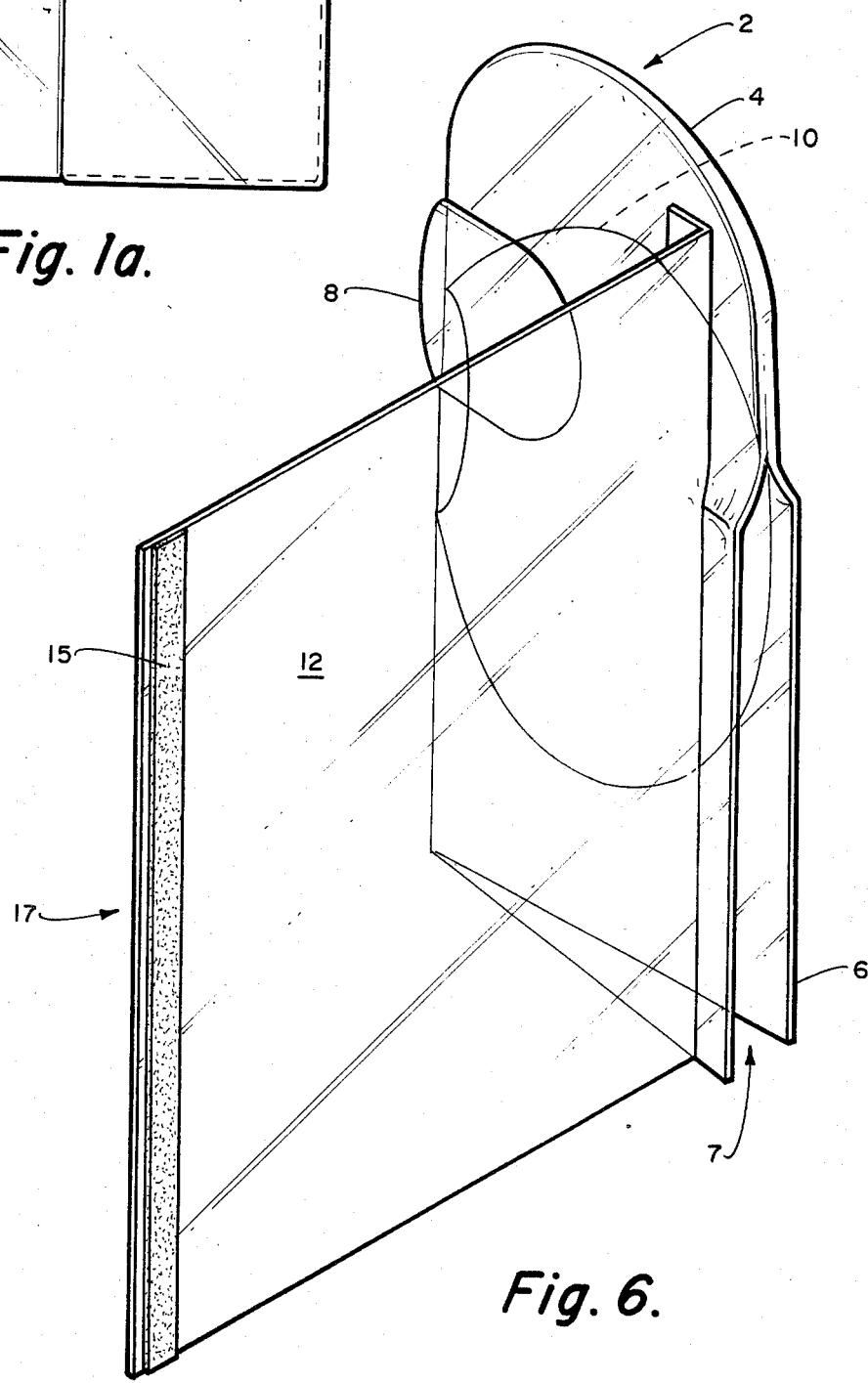
FIG. 6 is an oblique, side elevational view of the sleeve-like handset member of the invention.
Figure 4:
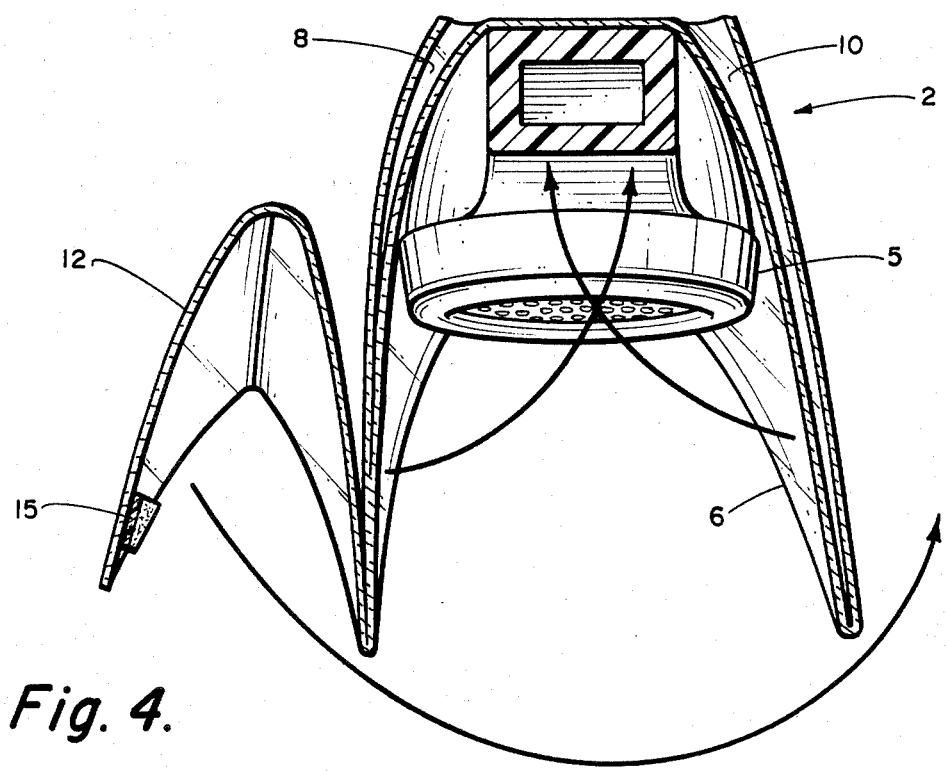
FIG. 4 is a fragmented, cross-sectional view taken along the line 4—4 of FIG. 1, showing a sleeve-like handset member of the invention employing a thumb pouch, opposing fingers pouch, and a flap-like cover section to overlap and cover the mouthpiece section of the handset member of the telephone.
Figure 5:
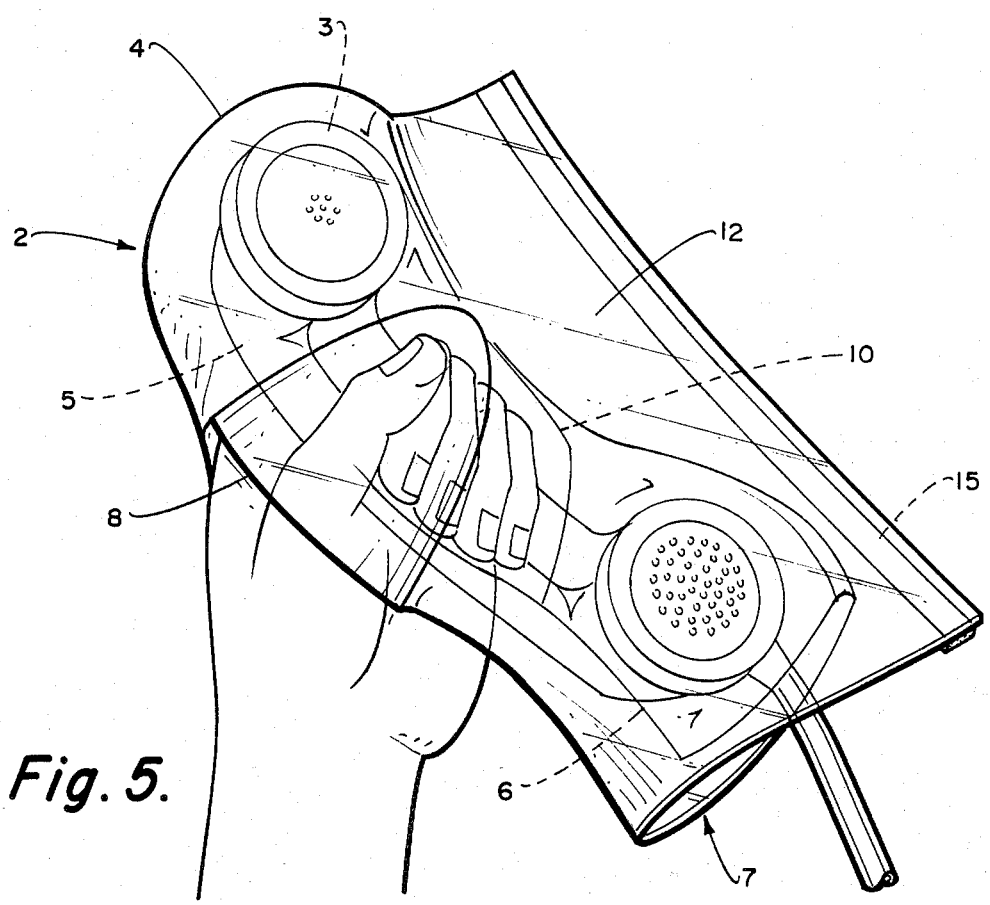
FIG. 5 is a perspective view of the handset member showing how a hand would engage the sleeve-like handset member of the invention to grasp and retain the handset member of the desk telephone without direct, physical contact; also shown is a telephone cord encased within a cord-encasing member of the invention.

In a preferred embodiment, as shown especially in FIGS. 4, 5 and 6, the pouches are located and adapted to receive, in said first pouch 8, a thumb, and in said second pouch 10, remaining opposing fingers of the hand.

Once said thumb and opposing fingers are inserted into the first pouch 8 and the second pouch 10, respectively, they are capable of grasping and holding the telephone handset 5 retained in said closed end 4 of the sleeve-like handset member 2.

Pouches 8 and 10 can be of integral construction with the sleeve-like handset member 2 or can be formed from separate pieces of thin, flexible, transparent, translucent or opaque material which are joined to the exterior surface of the sleeve-like handset member to form said first pouch 8 and said second pouch 10.

Acceptable means of joining these separate pieces to the exterior surface of the sleeve-like handset member 2, are by using a heat seal, glue or adhesive applied along a portion of the periphery of the piece and the corresponding area on the exterior surface of the sleeve-like handset member.

In a preferred embodiment, a heat seal would be the chosen means of joining the pieces to the exterior surface of the sleeve-like handset member.

A flap section 12 is located along the partially open side 6. The flap section 12 has sufficient length and width to overlap and cover the telephone handset 5 retained in said closed end 4 of the sleeve-like handset member 2.

Flap section 12 can be integrally formed along the partially opened side of the sleeve-like handset member, or it can be formed from a separate piece of thin, flexible, transparent, translucent or opaque material which is continuously joined along one side of its periphery to the exterior surface of the sleeve-like handset member.

Acceptable means of joining a separate piece of material to form a flap-like section to the sleeve-like handset member include using a heat seal, glue, or an adhesive applied along one side of the periphery of the piece, and the corresponding area on the exterior surface of the sleeve-like handset member.

In a preferred embodiment, the flap-like section would be formed integrally with the sleeve-like handset member, thereby reducing both cost and manufacturing complexity.

The flap section 12 has a sealing means adjacent a majority of its periphery 17 adapted to continuously seal said flap section 12 to said exterior surface of said sleeve-like handset member 2, thus effectively preventing physical contact with said telephone handset 5 retained in said sleeve-like handset member 2.

The preferred embodiment shown in the drawings, especially FIG. 6, shows a continuous pressure sensitive adhesive strip 15 located adjacent a majority of the periphery 17 of said sleeve-like handset member 2 so as to permit said lengthwise periphery 17 of said sleeve-like handset member 2 to be joined and continuously sealed to said exterior surface of said sleeve-like handset member 2.

The sleeve-like handset member described above is capable of being dispensed from a vending machine. The sleeve-like handset member can be folded and placed in a sealed package to keep it uncontaminated awaiting vending and use.

Alternatively, it could be so positioned as to permit an authorized user to insert his hand directly into the pouches and remove the sleeve-like handset member from the vending machine.

Another embodiment of the invention for use in areas where the risk of contagion is more serious than that described above, will add to the above-described sleeve-like handset member 2, a generally rectangular-shaped, cord-encasing member 14 of thin, flexible, transparent, translucent or opaque material shown in FIGS. 1, 3 and 5. It should be of sufficient length to cover, and width to encircle, a telephone cord 11 extending from the telephone handset 5 to a telephone base member 13.

The cord-encasing member should have a means to seal its opposing, lengthwise peripheries continuously to one another, thereby forming a hollow cylinder capable of encasing and retaining said telephone cord within a bore of said hollow cylinder. A preferred means to seal the opposing lengthwise peripheries of said cord-encasing member is a pressure sensitive adhesive strip located adjacent at least one lengthwise periphery of the cord-encasing member so as to permit the lengthwise peripheries of the cord-encasing member to be joined and continuously sealed thus forming a hollow cylinder, encircling and encasing the telephone cord within its bore.

Another embodiment of the invention, for use in areas where the risk of contagion is high, for example, hospital contagion wards, adds a base-enbasing member 18, shown in FIGS. 1, 1a and 2, to the sleeve-like handset member 2 and the cord-encasing member 14 described above for use with desk telephones employing either a push button dialing mechanism, or an operator pickup dialing system.

The base-encasing member 18 is made of a thin, flexible material, nonopaque, at least in the area covering the dialing mechanism, and has an upper body portion 20 which is generally conformable to a telephone base member 13 being covered.

The base-encasing member 18 has a flap-like lower body portion 22 located along one of the lower edges of the upper body portion 20.

The flap-like lower body portion 22 can be integrally formed with the upper body portion 20, or be a separate piece of thin, flexible material which is continuously joined along one side of its periphery to a lower edge of the upper body portion 20.

Acceptable means of joining the flap-like lower body portion 22 to the lower edge of the upper body portion 20 include using a heat seal, glue, or an adhesive applied along one side of the periphery of the flap-like lower body portion 22 and along the corresponding area on the periphery of the lower edge of the upper body portion 20.

In the preferred embodiment, the flap-like lower body portion 22, would be formed integrally with the upper body portion 20, thereby reducing cost and manufacturing complexity.

The lower body portion 22 should have sufficient length and width so as to enable it to overlap and encapsulate a telephone base member 13 retained in the upper body portion of the base-encasing member 18.

A sealing means is provided along a majority of the remaining edges of the periphery of the flap-like lower body portion of the base-encasing member to enable the remaining sides of the periphery of the base-encasing member to be continuously joined to the lower edges of the upper body portion and the cord-encasing member described above, thereby encapsulating any telephone base member retained in the upper body portion of the base-encasing member.

A preferred sealing means is a pressure sensitive adhesive strip 24 located adjacent a majority of the periphery of the lower body portion 22, so as to permit the lower body portion to be joined to the upper body portion adjacent the lower edges of the upper body portion of the base-encasing member.

In a preferred embodiment, a thin, flexible, nonpermeable plastic material would be used in constructing the sleeve-like handset member, the cord-encasing member, and the base-encasing member.

The material used to construct the sleeve-like handset member, the cord-encasing member and the base-encasing member may be made in different colors. The material can also be coated with a sanitized spray to insure cleanliness and further aid in retarding the transmission of germs and the like.

In an alternative embodiment of the sleeve-like handset member of the invention, not illustrated in the drawings, the flap section is located horizontally intermediate the closed end and the upper terminus of the opening of the partially open side. In this alternative embodiment, the flap section folds downward to cover the telephone handset retained in the closed end of the sleeve-like handset member.

An alternative sealing means, not illustrated in the drawings, which can be used in connection with the sleeve-like handset member, the cord-encasing member and/or the base-encasing member is a ziplock strip adapted to continuously seal any one or any combination of the above sleeve-like handset, cord-encasing or base-encasing members.

The receiver cover may have adhesive on its inside surface near the lower edge which would adhere to and hold the telphone cord cover once it is pushed up inside receiver cover. Also, the base cover may have a small portion of extra material which would protrude for the base and cover the outside of the cord cover. This protruding portion of the base would have adhesive on its inside surface and would form a seal once the cord cover was inserted into it. This arrangement would then form one completely sealed unit from and including the receiver cord and base.

Thus, there has been disclosed, an inexpensive, disposable sanitary cover for telephones which is capable of being vended in coin-operated machines and the like.

While there will be various modifications, anterations and changes which will suggest themselves to those of ordinary skill in the art, all such changes, alterations and modifications are intended to be covered by the appended claims.

I claim:

1. A sanitary cover for a telephone comprising: a sleeve-like member of a thin, flexible material, closed on one end and having an opposite open end to receive and retain therein a telephone handset; said sleeve-like member having, on its exterior surface intermediate said open end and said closed end, a first pouch and a second pouch, having opposed inlets to receive and retain therein fingers of a hand to grasp and retain said telephone handset; and, a flap section integral with said sleeve-like member on its exterior surface, to overlap and cover said telephone handset having a sealing means along a majority of its periphery adapted to join said flap section to the exterior surface of said sleve-like member, whereby said handset is entirely encompassed by said sanitary cover.

2. The sanitary cover, in accordance with claim 1, wherein said first pouch is positioned to receive a thumb of a hand, and said second pouch is positioned to receive the remaining opposing fingers of said hand, to facilitate said hand grasping said telephone handset.

3. The sanitary cover, in accordance with claim 1, wherein said sealing means is a pressure sensitive adhesive strip located adjacent a majority of the periphery of said flap section.

4. The sanitary cover, in accordance with claim 1, wherein said sealing means is a "Ziplock" strip located adjacent a majority of the periphery of said flap section.

5. The sanitary cover, in accordance with claim 1, which additionally includes: a cord-encasing member of thin, flexible material of sufficient length to cover and width to encircle a telephone cord extending from said telephone handset member, to a telephone base member, and having a sealable means adjacent at least one lengthwise periphery of said cord-encasing member to enable it to encircle and retain said telephone cord therein.

6. The sanitary cover, in accordance with claim 5, wherein said sealable means is a pressure sensitive adhesive strip located adjacent at least one lengthwise periphery of said cord-encasing member.

7. The sanitary cover, in accordance with claim 5, wherein said sealable means is a "Ziplock" strip located adjacent at least one lengthwise periphery of said cord-encasing member.

8. The sanitary cover, in accordance with claim 1, which additionally includes: a base-encasing member having an upper body portion generally conformable to said telephone base member made of thin, flexible material, at least nonopaque in the area covering the dialing mechanism of said telephone base member, and a flap-like lower body portion of thin, flexible material integral with said upper body portion along one side of a lower edge of the upper body portion, having a sealing means along a majority of its periphery and having sufficient dimension to enable it to cover and overlap said telephone base member enshrouded by said upper body portion by sealing said periphery of said flap-like lower body portion to said lower edge of said upper body portion, thereby encasing said telephone base member within said base-encasing member.

9. A sanitary cover for a telephone comprising: a base-encasing member having an upper body portion generally conformable to a telephone base member said upper body portion being made of thin, flexible material, at least non-opaque in the area covering a dialing mechanism on said telephone base member, and a flap-like lower body portion of thin, flexible material integral with said upper body portion along one side of a lower edge of the upper body portion, having a sealing means along a majority of its periphery and having sufficient dimension to enable it to cover and overlap said telephone base member enshrouded by said upper body portion by sealing said periphery of said flap-like lower body portion to said lower edge of said upper body portion, thereby encasing said telephone base member within said base-encasing member, and a sleeve-like member of thin, flexible material, closed on one end and having an opposite open end to receive and retain therein a telephone handset, said sleeve-like member having, on its exterior surface intermediate said open end and said closed end, a first pouch and a second pouch having opposed inlets to receive and retain therein fingers of a hand to grasp and retain said telephone handset; and, a flap section integral with said sleeve-like member on its exterior surface to overlap and cover said telephone handset.

* * * * *